Jan. 14, 1936.  C. C. ALLAN  2,028,034
MEANS FOR USE IN MAKING ANGULAR ADJUSTMENTS AND MEASUREMENTS
Filed Jan. 12, 1935
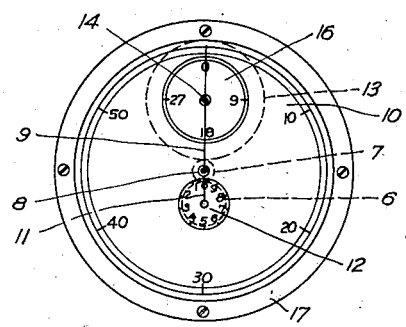
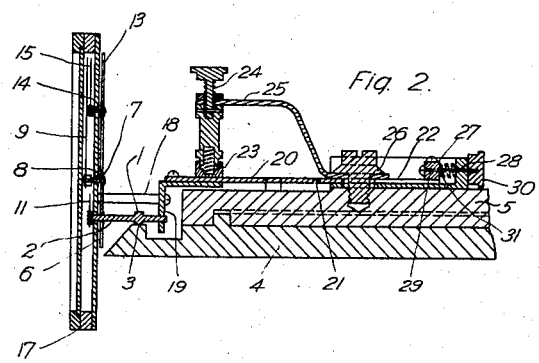
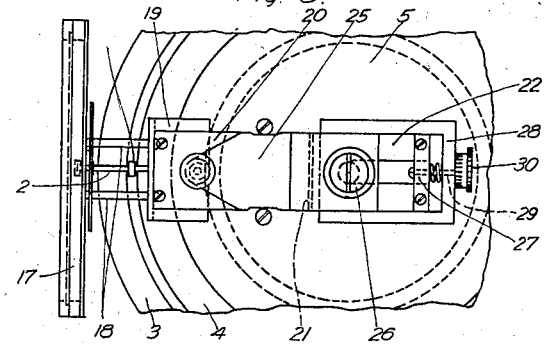
Inventor
Charles Cyril Allan
per Munn & Co.
Attorney.

Patented Jan. 14, 1936

2,028,034

UNITED STATES PATENT OFFICE 2,028,034

MEANS FOR USE IN MAKING ANGULAR ADJUSTMENTS AND MEASUREMENTS

Charles Cyril Allan, Pietermaritzburg, Natal, Union of South Africa

Application January 12, 1935, Serial No. 1,581 In Union of South Africa October 23, 1934

5 Claims. (Cl. 33—69)

This invention relates to means for use in making angular adjustments and measurements, such as required, for example, in theodolites, sextants, protractors and like instruments.

At present, such instruments generally embody a fixed graduated ring or arcuate member with which cooperates a vernier or micrometer carried by a part of the instrument turnable with respect to the said ring or member. The graduated ring or member and the vernier or micrometer are, however, comparatively expensive to manufacture, and involve the use of a microscope, which makes it cumbersome to read the graduations, especially in a dull light, and may give rise to errors.

The object of the present invention is to eliminate these drawbacks and provide an inexpensive means whereby the reading can be made readily and accurately.

According to the invention, I provide means for making angular measurements or adjustments in which the parts of the instrument to be turned relatively to each other are provided respectively with a circular, arcuate or other running track and a wheel or roller adapted to roll upon, or be rotated by, the said track, an indicating pointer or like element or elements being operated by such roller or wheel, through the intermediary, if desired, of gearing, so as to give a direct precise indication or measurement of the relative angular movement of the aforesaid parts, readable with the naked eye.

If desired, the track may be fixed and the wheel or roller carried by an axle or member adapted to swing about an axis coincident or substantially coincident, with that of the track. Preferably, the relative peripheries of the roller or wheel and the track are so made that, with or without gearing, an indication or measurement of the angular movement can be obtained on a dial or dials in degrees, minutes and seconds, and/or other known units. In practice, the means may have a large dial graduated to represent one degree in minutes and seconds, and two miniature dials marked within the face thereof, one graduated to represent one revolution of the track and the axis of the wheel or roller relatively to each other in "tens" of degrees, and the other to represent a fraction of such revolution in degree units.

The driving contact between the wheel or roller and the track may be obtained by friction of their surfaces and spring or other resilient means may be provided to maintain a constant yielding pressure between the contacting surfaces of the wheel or roller and the track, so as to obviate or reduce the possibility of slip or play and consequent inaccurate measurement. As an alternative for the same purpose, the track and/or the roller or wheel may be magnetized so as to be under constant attraction towards each other. Screw or other means may also be provided for adjusting the distance of the roller or wheel from the common centre of rotation of the axle thereof and the track, proper adjustment being preferably effected initially by the maker of the instrument and a screw or other device being provided for fixing or setting the roller or wheel in the correct position.

Means embodying the invention will now be described, by way of example, with reference to the annexed drawing, in which:—

Fig. 1 is a front view of the indicator used in such means;

Fig. 2 is a cross-sectional side elevation of the means, partly broken away;

Fig. 3 is a plan view corresponding to Fig. 2.

Referring to the drawing:—

The roller 1 is formed integral with an axle 2 and is in frictional contact with a fixed annular track 3. The base 4, whereon the track is formed, rotatably supports a turntable 5, the axis of rotation of such table and the centre of the track 3 being coincident with each other.

The axle 2 carries a toothed wheel 6 which meshes with a toothed wheel 7 carried by a spindle 8, bearing a large pointer 9 on its outer end. Such pointer is adapted to cooperate with a large graduated dial 10, which, in practice, is marked to represent one degree divided into minutes, each minute being subdivided into fractions each representing twenty seconds. At the outer end of the axle 2, a small pointer 11 is provided, adapted to cooperate with a miniature dial 12, marked to represent ten units of degrees. The toothed wheel 7 is adapted to drive a toothed wheel 13 secured on a spindle 14 carrying a small pointer 15. For co-operation therewith, a miniature dial 16 is provided, graduated to represent 360° divided into "tens" of degrees. As will be understood, in the case of the peripheries of the roller 1 and track 3 being made in the ratio one to thirty-six, the relative number of teeth in the wheels 6, 7 and 13 should be one hundred, ten, and three hundred and sixty, respectively.

The indicator casing 17 is carried by a pair of arms 18 fixed to a bracket 19, in which, also, is journalled the inner end of the axle 2. The bracket 19 is secured on the outer end of an arm 20, formed with a saw-cut 21 so as to render the outer portion thereof springy relative to the inner slotted portion 22. Downward pressure is resiliently exterted on the outer end of the arm 20 by a spring buffer 23, the pressure of which can be varied by a screw 24 threaded through a screwed opening in a spring-bracket 25. A screw-pin 26 secures both the arm 20 and the bracket 25 on the turntable 5. For the purpose of adjusting the roller 1 radially with respect to the track 3, the arm 20 is provided with an upstanding lug 27, through which, and a relatively fixed bracket 28, a screw-bolt 29 passes, so that, when the screw-pin 26 is slackened, the arm 20 can be moved lengthwise by turning a knurled nut 30, the spring 31 exerting a constant pressure on the lug 27 outwardly from the bracket 28.

Various modifications may be made in the means described without departing from the scope of the invention. For example, the roller or wheel and the track may be provided with intermeshing teeth, and whether a toothed or friction drive is relied upon the roller or wheel may, in contrast to the construction described, be adapted to rotate about a fixed axis while the track rotates along with one of the angularly movable parts, or, as a further alternative, both the track and the arm carrying the roller or wheel may be independently rotatable about a common centre. Preferably, the track in the case of a friction drive is made of frosted glass, agate, or similar hard substance, while the roller or wheel is made of phosphor bronze or like metal or material adapted to exert a satisfactory frictional grip on the track. In the case of toothed gearing, the track may be made of steel and the wheel either of steel or other substance such as phosphor bronze. Amongst other modifications, which may be made in the means described, may be mentioned the coating with luminous paint of the pointer or other indicating element or elements, and the units and graduations on the dial or dials, so as to be readily readable in the dark.

Whilst the invention has been described as of general application to the measurement of angles, it will be understood that, in respect of any particular instrument, incidental modifications may be made. For example, in the case of a theodolite, the track may take the place of, or be constituted by, the ordinary graduated fixed horizontal circle, and the roller or wheel may be carried on an axle mounted on the usual horizontal turntable, which also carries the gearing and indicating dial. Moreover, the invention may be applied to the means for adjusting the telescope of the theodolite about its horizontal axis, in which case, the track may take the place of, or be constituted by, the usual graduated vertical circle, and the roller or wheel may be carried on an axis fixed relatively to the supports of the arc, such supports, or the turntable bearing them, also carrying the corresponding gearing and dial.

In the application of the invention to a protractor, the circular or semi-circular portion thereof may constitute the track, and the roller or wheel be carried in an arm adapted to swing about the centre from which the circular or semi-circular portion is struck, such arm or an extension thereof being also provided with a depressible pin or marker which can be operated to mark off any particular angle as indicated or measured by the pointer operated from the roller or wheel.

I claim:—
1. Means for use in measuring angular movement between relatively rotatable elements comprising, in combination, a track associated with one of said elements, a wheel associated with the other of said elements so that on relative rotation of said elements, said track and wheel roll relative to each other, resilient means for maintaining a constant yielding pressure between the contacting surfaces of the wheel and track to obviate slip or play, and indicating means operable by said wheel to give a direct precise measurement of the relative angular movement of said elements readable with the naked eye.

2. Means for use in measuring angular movement between relatively rotatable elements comprising, in combination, a track associated with one of said elements, a wheel associated with the other of said elements so that upon relative rotation of said elements, said track and wheel roll relative to each other, resilient means for maintaining constant yielding pressure between the contacting surfaces of said wheel and track to obviate slip or play, a device for adjusting the distance of the wheel from the common centre of rotation of the axis thereof and the track, and indicating means operable by said wheel to give a direct precise measurement of the relative movement of said elements readable with the naked eye.

3. Means for use in measuring angular movement between relatively rotatable elements comprising, in combination, a track associated with one of said elements, a wheel associated with the other of said elements so that, on relative rotation of said elements, said track and wheel will roll relative to each other, a leaf spring for maintaining a constant yielding pressure between the contacting surfaces of the wheel and track to obviate slip or play, and indicating means operable by said wheel to give a direct, precise measurement of the relative angular movement of said elements, readable with the naked eye.

4. Means for use in measuring angular movement between relatively rotatable elements comprising, in combination, a track associated with one of said elements, a wheel associated with the other of said elements so that, on relative rotation of said elements, said track and wheel will roll relative to each other, a leaf spring for maintaining a constant yielding pressure between the contacting surfaces of the wheel and track to obviate slip or play, means for adjusting said pressure, and indicating means operable by said wheel to give a direct, precise measurement of the relative angular movement of said elements, readable with the naked eye.

5. Means for use in measuring angular movement between relatively rotatable elements comprising, in combination, a track associated with one of said elements, a wheel associated with the other of said elements so that, on relative rotation of said elements, said track and wheel will roll relative to each other, a carrier for said wheel, screw means to adjust said carrier relative to the centre of said track, means for fixing said carrier in adjusted position, and indicating means operable by said wheel to give a direct precise measurement of the relative movement of said elements, readable with the naked eye.

CHARLES CYRIL ALLAN.